(12) United States Patent
Calderon

(10) Patent No.: US 7,786,327 B2
(45) Date of Patent: Aug. 31, 2010

(54) METHOD FOR CO-PRODUCING ELECTRIC POWER AND UREA FROM CARBONACEOUS MATERIAL

(76) Inventor: Albert Calderon, 500 Lehman Ave. P.O. Box 126, Bowling Green, OH (US) 43402

( * ) Notice: Subject to any disclaimer, the term of this patent is extended or adjusted under 35 U.S.C. 154(b) by 1045 days.

(21) Appl. No.: 11/506,939

(22) Filed: Aug. 21, 2006

(65) Prior Publication Data

US 2008/0041284 A1 Feb. 21, 2008

(51) Int. Cl.
*C07C 273/02* (2006.01)
*C07C 273/04* (2006.01)
*C07C 273/10* (2006.01)
*B01J 10/00* (2006.01)
*B01J 8/00* (2006.01)
*H02K 7/18* (2006.01)
*F02C 6/00* (2006.01)
*F02C 6/20* (2006.01)

(52) U.S. Cl. ............ 564/63; 290/52; 422/187; 422/189; 422/196; 422/200; 564/65; 564/67; 564/69; 564/70; 564/71; 564/72; 564/73

(58) Field of Classification Search .......... 290/52; 422/187, 189, 196, 200; 564/63, 65, 67, 564/69, 70, 71, 72, 73
See application file for complete search history.

*Primary Examiner*—Peter G O'Sullivan

(57) ABSTRACT

A method for co-producing electric power and urea from carbonaceous fuels such as coal, by pyrolyzing the coal with oxygen to produce a raw rich gas and a hot char which is gasified with air to produce a raw lean gas. Subsequent to the cleaning of the two gases, the cleaned rich gas is made up of CO and $2H_2$, and the clean lean gas is made up of $N_2+CO$. The CO in the rich gas is separated from the $2H_2$ and is added to the lean gas to enrich it with CO to become a lean fuel gas which fuels a gas turbine and is part of a combined cycle system which efficiently generates electric power while exhausting an off-gas (flue gas) made up of $N_2+CO_2$. The $2H_2$ separated from the CO, and the $N_2+CO_2$ of the exhausted flue gas are together synthesized to produce urea —$CO(NH_2)_2$. To augment the $2H_2$ in order to make the process more efficient, steam is extracted from the power generation system, mixed with the $2H_2$, and electrolyzed in a high-temperature electrolysis system prior to the synthesis step with the electrical energy required for the electrolysis being derived from the combined cycle power generation source. This approach will consume the $CO_2$ in a beneficial manner by co-producing an added-value, useful by-product while at the same time obviating the necessity of collecting $CO_2$ and sequestering it, which is an inefficient way of mitigating the effect of global warming caused by $CO_2$.

15 Claims, 2 Drawing Sheets

METHOD FOR CO-PRODUCING ELECTRIC POWER AND UREA FROM CARBONACEOUS MATERIAL

BACKGROUND OF THE INVENTION

This invention relates to the production of clean and efficient energy from carbonaceous fuels such as coal, lignite, peat, petroleum coke, biomass, etc., especially as it relates to the generation of electric power and also as it relates to the recycling of the off-gas that is produced during the combustion of these fuels. Such off-gas, when scrubbed and stripped of mercury, is generally made up of nitrogen ($N_2$) and carbon dioxide ($CO_2$). The $CO_2$ is commonly referred to as a "greenhouse gas" and is suspected to contribute to global warming.

Attempts are being made to capture the $CO_2$ where it is generated and to sequester it by introducing it under pressure into such places as deep wells and underground reservoirs for permanent storage—a costly, inefficient, and questionable solution. Other approaches need to be discovered for the useful application of the flue gas instead of sequestering it, which would be beneficial to mankind; the instant invention relates to such useful application.

The applicant has discovered a method herein disclosed that reduces the formation of flue gas by being efficient when generating electric power while still using said carbonaceous fuels, and especially coal, and at the same time converting the flue gas that is generated into a useful by-product—namely, urea. Urea has many uses, especially when utilized as a fertilizer that enhances the growth of biomass as a potentially abundant, renewable energy resource in the agriculture sector.

Before describing the instant invention, it is to be noted that, from the various carbonaceous fuels referred to above, coal will be used as an example as the energy resource for the purpose of describing the invention herein, since more than four billion tons of coal are consumed yearly worldwide, and the majority of this tonnage is used to generate electricity.

OBJECTIVES OF THE INVENTION

The main object of the instant invention is to generate electric power from coal in an efficient and environmentally acceptable manner in order to produce the least amount of flue gas.

Another object is not to pulverize the coal and not to burn it, since pulverization of coal consumes appreciable amounts of energy, and combustion of coal in boilers to raise steam to turn a turbine tied to a generator is an inefficient manner of generating electric power.

Still another object is to avoid the use of pollution controls necessitated when combusting coal; these controls consume large quantities of parasitic power which must be generated additionally to the power that is exported from the generating facility. Such parasitic power, of course, adds to the formation of flue gas.

Further another object of the instant invention is to pyrolyze the coal to produce a synthetic gas (syngas) containing $H_2$ and CO, and a hot char which is gasified with air instead of oxygen to produce a lean gas, saving a large amount of energy that is needed to produce oxygen from an air-separation facility.

Yet another object of the invention is to clean the syngas as well as the lean fuel gas to recover the sulfur from these gases.

Therefore another object of the invention is to separate the $H_2$ from the CO in the syngas and to mix the CO into the lean gas to produce a lean fuel gas.

Further still, another object of the invention is to use the lean fuel gas in a combustion gas turbine to generate electric power more efficiently than combusting coal in a boiler, to raise steam by making use of the combined cycle mode to result in producing a smaller amount of flue gas containing $N_2$ and $CO_2$.

Further yet, another object of the invention is to utilize the $H_2$ from the syngas and the $N_2+CO_2$ in the flue gas and synthesize them into $CO(NH_2)_2$—namely, urea.

Still yet, another object of the present invention is to extract some of the steam from the combined cycle power generation and also utilize some of the power generated to electrolyze water at high temperature to generate additional hydrogen ($H_2$) to supplement the $H_2$ derived from the syngas.

It is therefore, another object of the instant invention is to use the $O_2$ derived from the electrolysis to serve as the oxidant in the pyrolysis of the coal.

These and other objects of the present invention will become more apparent to those skilled in the art to which this invention pertains from the following description and appended claims. Reference is now being made to the accompanying drawings forming a part of this specification. It is to be noted that the embodiments shown herein are for the purpose of description and not limitation.

Before proceeding with the detailed description of the invention by making use of the drawings, it is to be noted that for the sake of clarity reference will be made to the numerals and to the words to represent the various components and process streams.

DETAILED DESCRIPTION OF THE DRAWINGS

Figure 1:
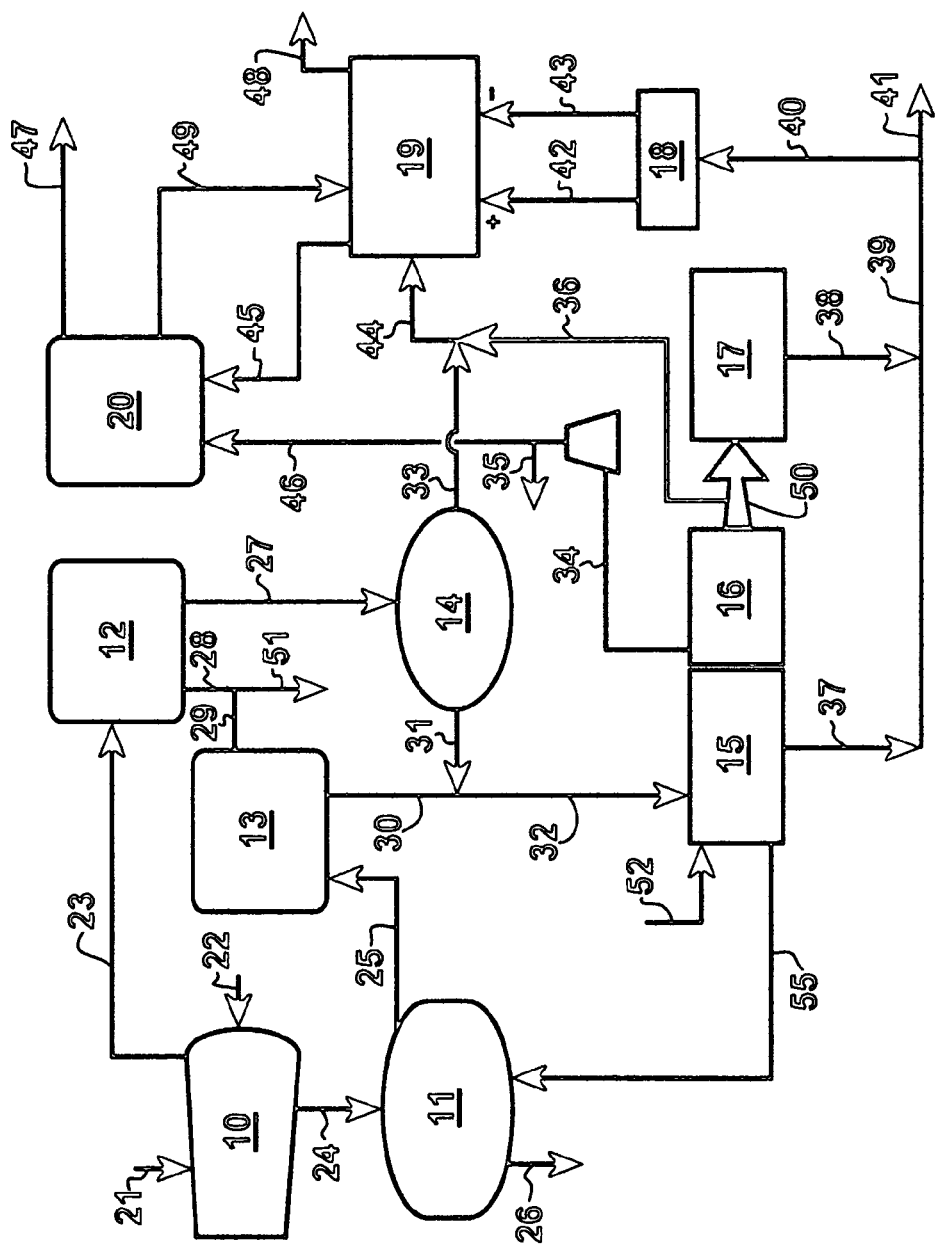
FIG. 1 is a process-flow diagram in block form of the invention with the components and process streams being numerically identified.

Referring to FIG. 1, numeral 10 denotes a pyrolysis chamber and numeral 11 a char gasifier; numeral 12 denotes a gas clean-up system for the rich gas from pyrolysis, and numeral 13 denotes a gas clean-up system for lean gas from gasifier 11; numeral 14 represents a gas separator to isolate the $H_2$ from the $H_2$ rich gas; numerals 15, 16, and 17 represent a combined cycle power generation assembly with numeral 15 denoting a gas turbine, numeral 16 denoting a heat recovery steam generator, and numeral 17 denoting a steam turbine; numeral 18 represents a rectifier to change the power from alternating current to direct current, and numeral 19 represents an electrolysis chamber to divide water into $H_2$ and $O_2$. Numeral 20 denotes a synthesis system for synthesizing $H_2$ and flue gas ($N_2+CO_2$) into urea and water—namely, $CO(NH_2)_2+H_2O$.

Before describing the operation of the instant invention, it is to be noted that the various streams incorporated in the method would include pressure boosting and pressure letdown equipment, such as compressors, expanders, and miscellaneous valves as required, depending upon the prevailing conditions, to enable the navigation of the flow of each stream. Since the use of such equipment is common practice in the field of chemical engineering and is known in the art to which this invention pertains, the applicant has obviated the inclusion of such equipment in the drawings, even though such equipment will be used in the application of the instant invention.

OPERATION

Figure 2:
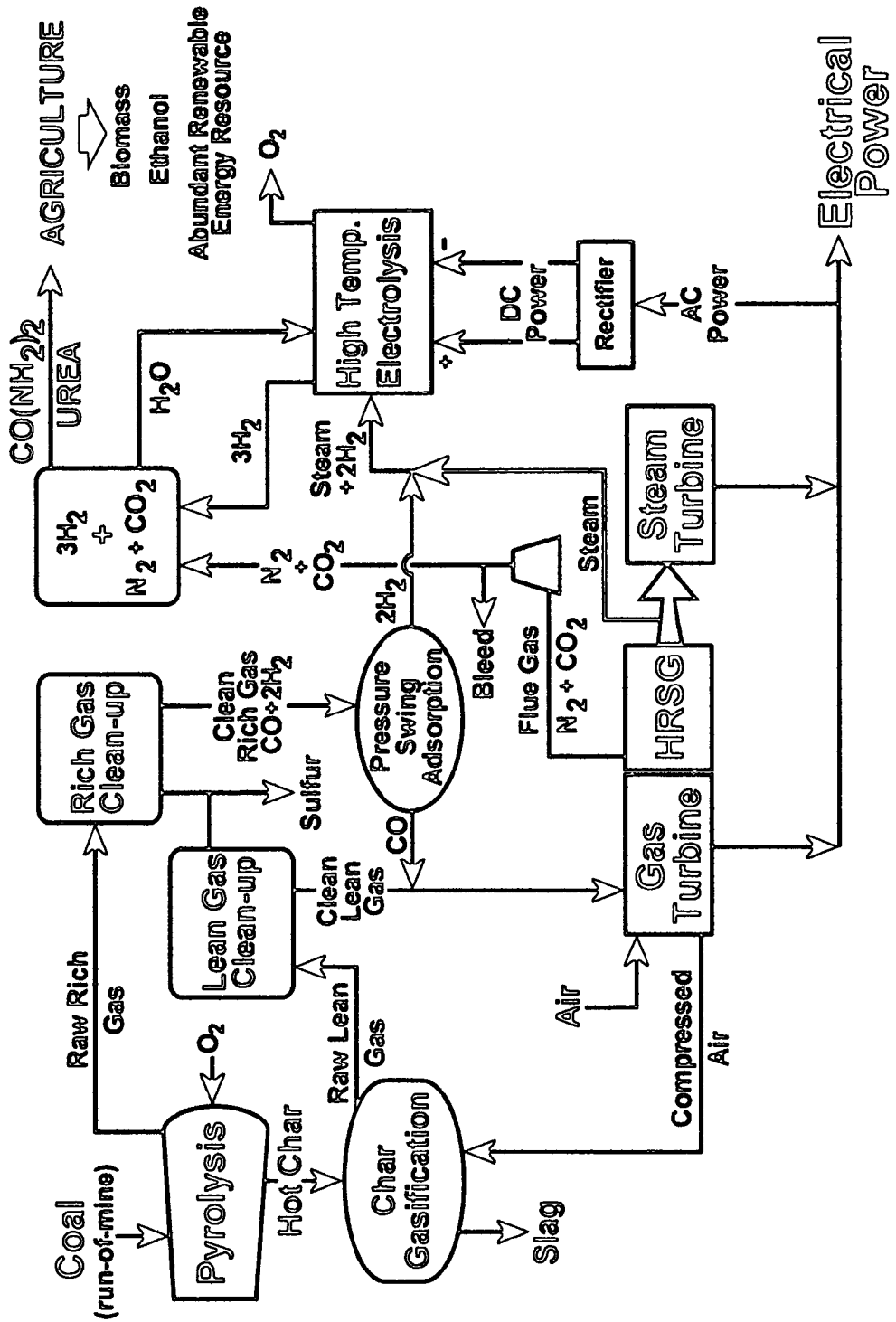
FIG. 2 is a process-flow diagram in block form of the invention with the components and process streams being identified with words.

Assuming that the process is already at steady state and referring to both FIGS. 1 and 2, coal denoted by stream 21 is fed into pyrolysis chamber 10 wherein $O_2$—stream 22 is injected into it to such an extent as to combust a small portion of the coal to generate the thermal energy required to devolatilize the coal to yield a raw rich gas having a high $H_2$ content—stream 23, which is directed to rich gas clean-up system 12. By controlling the $O_2$ input into chamber 10, the conditions within pyrolysis chamber 10 are maintained reducing while converting the coal into a hot char which is fed into gasifier 11—stream 24. Char being mostly carbon and highly reactive by virtue of its cellular and porous structure, is gasified with air—stream 55, derived from the compressor (not shown) of gas turbine 15, converting the carbon in the char into a hot, raw lean gas—stream 25, and slag—stream 26; raw lean gas—stream 25, leaves gasifier 11 and is directed to lean gas cleanup system 13. In both cleanup systems 12 and 13 the sulfur in the gases, is removed and it leaves cleanup 12 via stream 28 and cleanup 13 via stream 29; these two sulfur streams join to form stream 51.

The cleaned rich gas, which essentially is $CO+H_2$, leaves cleanup 12 via stream 27 and enters separator 14 to separate the $H_2$—stream 33, from the CO—stream 31. The clean lean gas, which essentially is $N_2+CO$, leaves cleanup 13 via stream 30 to which CO—stream 31, is added to form stream 32 which fuels gas turbine 15; air to combust stream 32 is furnished by stream 56 which is compressed prior to entering the combustion chamber (not shown) of gas turbine 15. The flue gas exhausting from the gas turbine is passed through heat recovery steam generator 16 to raise steam which is directed to steam turbine 17 via stream 50. Both gas turbine 15 and steam turbine 17 are each followed by a generator (not shown) to generate electric power most efficiently via the combined cycle mode which power leaves as streams 37 and 38, respectively, to form stream 39. The flue gas leaving heat recovery steam generator 16, which is made up of nitrogen and carbon dioxide ($N_2+CO_2$), is denoted by stream 34. A portion of the steam generated in heat recovery steam generator 16 is withdrawn as a side stream which is denoted by numeral 36; this side stream of steam together with $H_2$ stream 33 from separator 14 form stream 44, which is directed to high temperature electrolysis system 19 in order to increase the efficiency of $H_2$ generation. It is to be noted that side stream 36 may also be withdrawn from steam turbine 17.

An alternating electric current stream denoted by numeral 40 is directed to rectifier 18 where it is converted to direct electric current to form streams 42 and 43 which are directed to electrolysis system 19 in order to electrolyze the steam contained in stream 44 to yield a larger output of $3H_2$—stream 45, and $O_2$—stream 48; this larger output of $3H_2$ is directed to synthesis system 20, while the $O_2$, after being compressed (not shown), is directed to pyrolysis chamber 10 as stream 22.

Referring now to the flue gas, stream 34 ($N_2+CO_2$) is split to create a bleed of flue gas to maintain system balance denoted by numeral 35 to result in stream 46 which is directed to synthesis system 20 to synthesize the $3H_2$ and the flue gas ($N_2+CO_2$) to form urea ($CO(NH_2)_2$)—stream 47, with water being produced as a by-product and as denoted by stream 49 which is recycled to electrolysis system 19. It is to be noted that stream 46 ($N_2+CO_2$) may be activated, or the $N_2$ per se may be activated in order to make the $N_2$ more reactive while being synthesized. The formation of urea may also occur via the ammonia ($NH_3$) step by reacting $N_2$ with $3H_2$ to make $2NH_3$ and subsequently reacting the $2NH_3$ with $CO_2$ to form $CO(NH_2)_2+H_2O$.

To mitigate the discharge of $CO_2$ into the atmosphere or its sequestering, the production of urea via synthesis as disclosed, an abundant source of economical fertilizer will be made available to enhance the growth of a renewable biomass resource via agriculture which can be processed to produce ethanol, a gasoline additive, or other useful commodities.

It is submitted that the presentation made herein discloses an efficient method of generating electric power with lean gas which produces low $NO_x$ emissions by virtue that lean gas burns cooler, and by virtue that the lean gas possesses appreciable mass which leads to the generation of electric power most efficiently in a gas turbine and especially when used in conjunction with a heat-recovery steam generator with the steam being fed into a steam turbine to result in a combined cycle application. Further, the capability to utilize electric power for electrolysis at high temperature the process described herein becomes most efficient, especially when the electric power is used during off-peak periods to generate additional $H_2$ that is added to the $H_2$ produced from the volatile matter of the coal. Thus, the invention disclosed herein offers a major advantage in the generation of electric power and the conversion of flue gas directly or indirectly into urea, when compared to the collection of $CO_2$ and its sequestration in wells or reservoirs.

What is claimed comprises the following:

1. A method for co-producing electric power and urea from a carbonaceous material comprising the following:
    pyrolizing said carbonaceous material to produce a raw rich gas and a char;
    gasifying said char with air to produce a raw lean gas;
    cleaning said rich gas to yield $CO+H_2$ and cleaning said lean gas;
    separating said CO from said $H_2$ in said rich gas;
    combusting the lean gas with air in a gas turbine to generate electric power while exhausting a flue gas whose composition is $N_2+CO_2$ and recovering same; and
    synthesizing the $H_2$ recovered from the rich gas and the recovered $N_2+CO_2$ from the flue gas to produce urea ($CO(NH_2)_2$) and water as a by-product.

2. The method as set forth in claim 1 wherein the step of combusting the lean gas with air in a gas turbine to generate electric power is further characterized by the step of having said gas turbine followed by a heat-recovery steam generator which, in turn, is followed by a steam turbine to provide a combined cycle mode.

3. The method as set forth in claim 1 wherein the step of separating said CO from said $H_2$ in said rich gas is further characterized by the step of mixing the separated CO with the lean gas produced in order to yield a lean gas which is enriched with CO.

4. The method as set forth in claim 1 wherein the step of combusting the lean gas with air in a gas turbine to generate electric power while exhausting a flue gas whose composition is $N_2+CO_2$ is further characterized by the step of bleeding some of the flue gas to balance the system.

5. The method set forth in claim 2 is further characterized by the step of withdrawing steam from said heat-recovery steam generator.

6. The method as set forth in claim 2 is further characterized by the step of withdrawing steam from said steam turbine.

7. The method set forth in claim 1 or 2 further characterized by the step of electrolyzing water with electricity generated by said gas turbine to increase the output of $H_2$ while co-producing $O_2$.

8. The method as set forth in claim 7 further comprising the step of utilizing a high-temperature electrolysis system.

9. The method as set forth in claim 8 being further characterized by feeding a mixture of steam and hydrogen into said high-temperature electrolysis system to increase the efficiency of $H_2$ generation.

10. The method as set forth in claim 7 further comprising the step of rectifying the power from AC to DC to enable the electrolysis step to occur.

11. The method as set forth in claim 1 wherein the step of synthesizing the $H_2$ recovered from the rich gas and the $N_2+CO_2$ recovered from the flue gas is further characterized by the step of feeding the $H_2$ produced by electrolyzing water with electricity generated by said gas turbine and feeding the $N_2+CO_2$ remaining after a bleeding step of some of the flue gas to balance the system thereby producing urea and water as a by-product.

12. The method as set forth in claim 11 comprising the step of recycling the water.

13. The method as set forth in claim 7 wherein the $O_2$ that is co-produced is recycled to the pyrolizing step, to serve as an oxidant.

14. The method as set forth in claim 1 wherein the step of synthesizing the $H_2$ recovered from the rich gas and the $N_2+CO_2$ recovered from the flue gas is further characterized by the step of activating the $N_2$ in the flue gas to facilitate its synthesis into urea.

15. The method as set forth in claim 1 wherein the step of synthesizing the $H_2$ recovered from the rich gas and the $N_2+CO_2$ recovered from the flue gas is further characterized by the step of utilizing the ammonia route to form the urea.

* * * * *